Mar. 27, 1923.

L. BROWN

TIRE CASING

Filed May 19, 1921

1,449,582

Inventor:
London Brown

Patented Mar. 27, 1923.

1,449,582

UNITED STATES PATENT OFFICE.

LONDON BROWN, OF WILLOW, OKLAHOMA, ASSIGNOR TO LEE R. ENGLAND, OF CARTER, OKLAHOMA, AND JOHN F. VINSON, OF WILLOW, OKLAHOMA.

TIRE CASING.

Application filed May 19, 1921. Serial No. 470,918.

*To all whom it may concern:*

Be it known that I, LONDON BROWN, a citizen of the United States, residing at Willow, in the county of Greer and State of Oklahoma, have invented certain new and useful Improvements in Tire Casings, of which the following is a specification.

This invention relates to certain improvements in tire casings and it is an object of the invention to provide a device of this general character with novel and improved means whereby the same, when applied to a wheel, serves to increase the tractive efficiency of the tire and at the same time serving to prevent slipping in sand or on smooth or slippery roadways.

The invention consists in the details of construction and in the combination and arrangement of the several parts of my improved tire casing whereby certain important advantages are attained and the device rendered simpler, less expensive and otherwise more convenient and advantageous for use, as will be hereinafter more fully set forth.

The novel features of my invention will hereinafter be definitely claimed.

Figure 1:
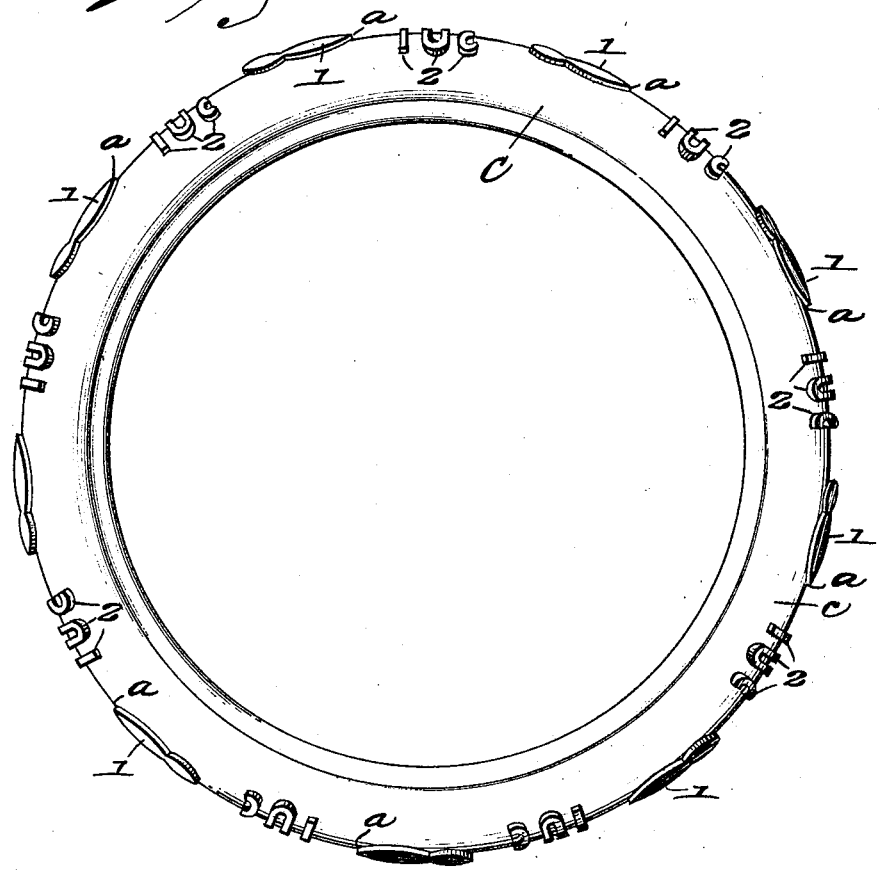
Figure 2:
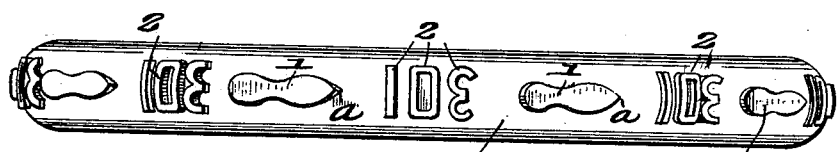

In order that my invention may be the better understood, I will now proceed to describe the same with reference to the accompanying drawings, wherein:

Figure 1 is a view in side elevation of a casing constructed in accordance with an embodiment of my invention; and Figure 2 is a view in top plan of the device as herein disclosed.

As disclosed in the accompanying drawing, C denotes a tire casing which has molded or otherwise produced on its periphery outstanding traction or ground working members 1, each herein disclosed as a diagrammatic representation of a foot with the point or toe portion $a$ thereof disposed circumferentially and in the normal direction of travel of the wheel to which the casing is applied. The rear or heel portion of each of the members 1 is rounded and the side portions thereof are provided with recesses formed by inbows, such structure being occasioned by the fact that the member 1 is a diagrammatic elevation of a foot. These members 1 are also arranged at the transverse center of the tread portion of the casing and are preferably equi-distantly spaced around the casing.

Interposed between adjacent members 1 are the outstanding members 2, said members 2 being in the form of numerals and such numerals are adapted to represent a register or other identifying number of the vehicle with which the tire casing is employed so that as the vehicle is in transit, the numbers on the casing C will be impressed in the roadway or other surface so that by this means the vehicle may be readily identified. This is of particular advantage in tracing a stolen car or in case of trailing a driver who has failed to comply with traffic regulations or who for any other cause it is desired to apprehend.

The numerals 2 also provide means to increase the tractive action of the casing and also to prevent slipping.

It will be particularly noted in the accompanying drawings that the point or toe portion $a$ of each of the members 1 is relatively sharp and which facilitates the meshing or interlocking of said member with the roadway, so that the possibility of slipping is minimized and which slipping is further minimized by the recesses in the sides of the member 1 between the toe and heel portions thereof. In other words, the particular formation of each of the members 1 permits said member to operate effectively to prevent slipping of the wheel or side skid in either direction.

From the foregoing description it is thought to be obvious that a tire casing constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A tire casing having a series of similar outstanding members carried by the periphery thereof at the tread portion, said members being spaced circumferentially of the tire in its medial plane, each of said members being irregular in contour and elongated in a direction circumferentially of the tire with an end portion pointed and its side marginal portions provided with inbows forming recesses, the opposite end portion of the member being rounded.

LONDON BROWN.